Patented Aug. 20, 1935

2,012,240

UNITED STATES PATENT OFFICE 2,012,240

MANUFACTURE OF WATERPROOF TEXTILE MATERIALS

Giuseppe Cogno, Torino, Italy

Application May 3, 1934, Serial No. 723,782
In Italy May 23, 1933

3 Claims. (Cl. 41—33)

Rubber proofed fabrics intended to be used in the manufacture of impermeable clothing have been made in the past either by spreading a rubber proofing composition on one side of the cloth, or by sticking together two separate fabrics of cloth or similar material by means of a layer of rubber spread between the two separate fabrics, one fabric forming the facing and the other the reverse of the finished cloth. Material formed by the first process, in which the finished cloth has a facing on one side, has the drawback that the rubber facing is cold and unpleasant to the touch, and fabrics of the second type have the disadvantage of being heavy in use and of being expensive to manufacture. Materials of the first type are sometimes treated with cloth or some other fabric on the reverse side by means of a stamping or similar process, so that the finished cloth has a facing on one side and is proofed on the reverse side by means of a stamping or similar process, so that the finished cloth has a facing on one side and is proofed on the reverse side.

Waterproofed fabrics have been faced or coated with finely divided materials such as flock which have been spread or scattered mechanically or otherwise onto an adhesive layer during the manufacture. Scattering the particles on to the waterproof layer evenly presents a difficult problem and one of the objects of the present invention is to provide a method whereby the cloth is faced with a thin layer of fibrous material which is evenly and smoothly applied and which appears in its finished form similar to a piece of woven fabric. This thin layer of textile material is thick enough to obviate the unpleasant feel of a rubber waterproof coating, but is sufficiently light and thin not to give the resulting material an undesirable heaviness. If desired, the main fabric may be treated similarly on the other side so that the resulting product consists of a very thin layer of textile material, a layer of rubber waterproofing composition, the main textile layer, another layer of rubber waterproofing composition and finally, another very thin textile layer.

Another object of the present invention is to provide a simple means whereby a waterproof material may be produced having a different pattern on the two sides, together with the advantages enumerated above.

According to the present invention I provide a method of proofing textile material consisting in applying a layer of waterproofing material to one face of the textile material applying a second piece of fabric to the exposed face of the waterproofing layer, and subsequently removing substantially the whole of the second fabric so as to leave a portion of the nap from the whole of the contacting surface of the said fabric, adhering to the waterproofing layer.

In order to illustrate more closely how the invention may be carried out in practice, the following details are given by way of example, though it is obvious that considerable variations may be made in the details here shown.

In the drawing filed herewith:—

Figure 1:
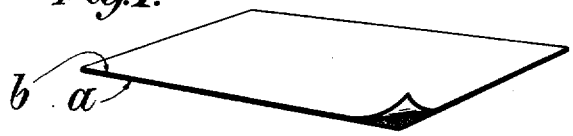
Figs. 1 to 4 show perspective views of the cloth in various stages of its manufacture.

Referring to the drawing:

Fig. 1 shows a piece of proofed fabric in which $a$ represents any suitable textile fabric which has been spread over on one of its faces with a layer of unvulcanized rubber mix $b$ by means of any ordinary spreading machine.

Figure 2:
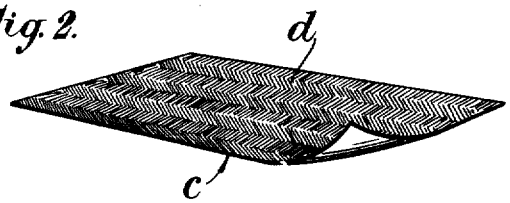

Fig. 2 shows a piece of fabric used as the sticking-on layer to be peeled off subsequently, the pattern on the face of the sticking-on fabric being represented by the lines $d$. The fabric shown in Fig. 2 must have a face covered with a nap of suitable length, its texture and colouring being of secondary importance, as also is the nature of the material of which it is made, which may be woolen, silk, cotton or other material. Any ordinary kind of camel hair fabric, for instance, will do for the purpose, as will also any fabrics of any colouring and of any manufacture, even those with a comparatively short nap, or felt fabrics of any colouring and manufacture.

Figure 3:
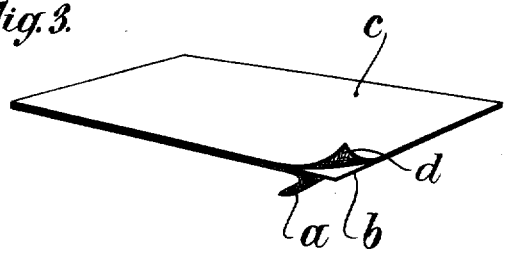
Figure 4:
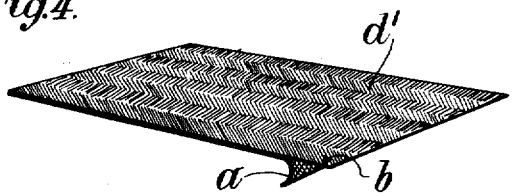

A piece of the fabric shown in Fig. 2 is then taken of the same size as the piece of proofed fabric shown in Fig. 1 and superimposed on it with the nap face downward, the resultant assemblage being shown in Fig. 3, in which $a$ and $b$ represent the fabric and the proofing layer as in Fig. 1, and $c$ represents the back of the sticking-on layer as in Fig. 2. The assemblage is then passed through a calender and may subsequently be vulcanized. Thereupon the sticking-on fabric is peeled off from the fabric $a$ so that on the proofed layer $b$ of fabric $a$ there remains adhering a portion, even if ever so slight, of the nappy surface of the sticking-on fabric sufficient to give to the fabric $a$ when seen from the proofed side $b$ the appearance of the sticking-on fabric in regard to pattern $d$ and colouring, this being now reproduced (as $d'$) over the proofed side of fabric $a$ as shown in Fig. 4. In other words, there is reproduced on top of the proofed surface $b$ of fabric a a true transfer by counter-draw of part of the face of the sticking-on fabric. This sticking-on fabric, having in the transfer process lost but a very small part of its superficial nappy layer may, after the transfer process, be turned again to its normal use, or else may serve for the transfer process several times repeated before becoming unserviceable.

If the sticking-on fabric has been stripped off before vulcanization, the material is vulcanized subsequently. In either case there is produced a perfectly impermeable cloth presenting a surface having the same appearance as that of the nap of the sticking-on fabric which has served for the transfer process.

Figure 5:
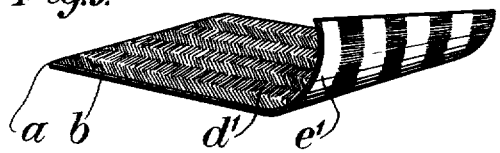
Fig. 5 is a perspective view of a piece of cloth constructed according to a modified method.

In accordance with the present invention, the same proofing and transfer processes may be repeated (either simultaneously or otherwise) also on the reverse side of fabric a, thereby obtaining a finished cloth (see Fig. 5), whereof both the facing and the reverse have been rubber-proofed to the same extent and presenting on either side the same aspect of proofing, although the patterns thereof may be made to look different (as in d' and e') if sticking-on fabrics of different patterns have been used.

As a variant, there may also be taken an original fabric a, bearing already on one of its sides a pattern of its own, whether printed or woven, in order to apply on the other side the proofing to be submitted to the transfer process by means of the sticking-on fabric, and in this case also there will be produced a single-ply impermeable cloth with facing and reverse but proofed only on one side. Such a cloth proofed only on one side may, of course, be used as such, or alternatively it may be printed on the reverse side by any of the usual means of printing, either before or after the preparation of the proofed fabric.

The single-ply impermeable cloth with facing and reverse produced through the process contained in the present invention will with a great saving of expense and weight replace the cloths with facing and reverse made up of two distinct fabrics stuck together which have been used up till now.

It is of course understood that the word "rubber" is used throughout this specification to denote the usual type of rubber mixture containing sulphur, fillers, accelerators, anti-oxidants and the like, as is usual in the art.

What I claim and desire to secure by Letters Patent is:—

1. Method of proofing textile material consisting in applying a layer of waterproofing material to one face of the textile material, applying a second piece of fabric to the exposed face of the waterproofing layer, and subsequently removing substantially the whole of the second fabric so as to leave a portion of the nap from the whole of the contacting surface of the said fabric, adhering to the waterproofing layer.

2. Method of proofing textile material consisting in applying a layer of waterproofing material to one face of the textile material, applying a second piece of fabric to the exposed face of the waterproofing layer, vulcanizing the assembled materials, and subsequently removing substantially the whole of the second fabric so as to leave a portion of the nap from the whole of the contacting surface of the said fabric, adhering to the waterproofing layer.

3. Method of proofing textile material consisting in applying a layer of waterproofing material to one face of the textile material, applying a second piece of fabric to the exposed face of the waterproofing layer, passing the assembled materials through a calender, vulcanizing the assembled materials, and subsequently removing substantially the whole of the second fabric so as to leave a portion of the nap from the whole of the contacting surface of the said fabric, adhering to the waterproofing layer.

4. Method of proofing textile material consisting in applying a layer of rubber to one face of the textile material, applying a second piece of fabric to the exposed face of the rubber layer, vulcanizing the assembled materials, and subsequently removing substantially the whole of the second fabric so as to leave a portion of the nap from the whole of the contacting surface of the said fabric, adhering to the rubber layer.

5. Method of proofing textile material consisting in applying a layer of waterproofing material to one face of the textile material, applying a second piece of fabric of any desired colour or pattern to the exposed face of a waterproofing layer, vulcanizing the assembled materials and subsequently removing the whole of the second fabric so as to leave a portion of the nap from the whole of the contacting surface of the second piece of fabric adhering to the waterproof layer.

6. Method of proofing textile material consisting in applying a layer of waterproofing material to both faces of the textile material, applying a second piece of fabric of any desired colour or pattern to the exposed face of each waterproof layer, vulcanizing the assembled materials, and subsequently removing substantially the whole of the second pieces of fabric so as to leave a portion of the nap thereon adhering to the waterproof layers.

7. A proofed textile material comprising a piece of textile material, a waterproofing layer on one face thereof, and a layer of fibrous material on the exposed face of the waterproofing layer, said fibrous layer composed of the nap of another piece of textile material.

8. A proofed textile material comprising a piece of textile material, a waterproofing layer on both faces thereof, and a layer of fibrous material on the exposed face of each waterproofing layer, the said fibrous layer composed of the nap of another piece of textile material.

GIUSEPPE COGNO.